United States Patent [19]

Kajino et al.

[11] 4,085,698

[45] Apr. 25, 1978

[54] DEVICE FOR DETECTING ROTATIONAL SPEED OF A TAPE REEL

[75] Inventors: Jirou Kajino; Naoyuki Ohara, both of Neyagawa, Japan

[73] Assignee: Matsushita Electric Industrial Co., Ltd., Osaka, Japan

[21] Appl. No.: 696,701

[22] Filed: Jun. 16, 1976

[30] Foreign Application Priority Data

Jun. 19, 1975 Japan ............................ 50-75128
Jun. 20, 1975 Japan ............................ 50-75970
Jun. 20, 1975 Japan ............................ 50-75969

[51] Int. Cl.² .................. G08B 5/36; G01D 5/32; G11B 15/18; B65H 25/30
[52] U.S. Cl. ............................. 116/114 J; 116/67 A; 242/57; 242/191; 340/259
[58] Field of Search ............. 242/191, 59, 186; 116/114 J, 67 A; 200/61.17; 340/259, 260

[56] References Cited

U.S. PATENT DOCUMENTS

| | | | |
|---|---|---|---|
| 2,514,402 | 7/1950 | Lyon | 242/191 |
| 3,305,185 | 2/1967 | Tegu | 242/57 X |
| 3,480,230 | 11/1969 | Hosono et al. | 242/191 |
| 3,759,463 | 9/1973 | Yoshii | 242/191 |
| 3,913,519 | 10/1975 | Sugano | 242/191 |

Primary Examiner—George F. Mautz
Attorney, Agent, or Firm—Wenderoth, Lind & Ponack

[57] ABSTRACT

A device for detecting rotational speed of a tape reel in a tape recording and/or reproducing apparatus by displacing a magnet from a first position where said magnet does not actuate a magnetically sensitive element to a second position where said magnet actuates the element when the rotational speed of a first rotating means adapted to rotate in synchronization with a supply reel exceeds the constant speed of a second rotating means driven by a tape moving means to rotate at a constant speed and coupled to said first rotating means and operating indicating means responsive to said element so as to inform an operator, for example, that only a little tape remains on the supply reel.

3 Claims, 5 Drawing Figures

DEVICE FOR DETECTING ROTATIONAL SPEED OF A TAPE REEL

This invention relates to a device for detecting the rotational speed of a tape reel in a tape recording and/or reproducing apparatus, and more particularly to a device for detecting the rotational speed of a supply reel, by which it becomes possible, for example, to give an alarm to an operator when the tape remaining on the supply reel has become less than a predetermined amount.

For the recording of some music or minutes of some important meeting using a tape recorder, it is very important for an operator to know the quantity of the tape remaining on the supply reel in order to make preparations for replacement of the exhausted tape with a new blank tape. In the case of a cassette tape recorder, it is rather difficult for the operator to see the tape on a small supply reel through a narrow window provided in the cassette shell. So, in a conventional cassette tape recorder, a tape end detector is provided for giving some alarm to an operator or for operating an automatic shut-off mechanism when the tape on the supply reel has run out. However, this function is not entirely satisfactory for continuous recording without interruption, because non-magnetic leader tapes are usually provided at the ends of the magnetic tape in a cassette.

Some attempts have been made to overcome this problem in the prior art. For example, a conventional technique uses the phenomenon that the rotational speed of a tape reel changes with a change of the amount of tape wound on the reel. The conventional technique detects the rotational speed of a tape reel so as to indicate whether the rotational speed of the tape reel is below or above a predetermined speed. For this purpose, an electrical pulse generator is connected to the supply reel roller to generate pulses in synchronization with the rotation of the supply reel. This equipment can produce alarm signals when the intervals between generated pulses have become shorter than a predetermined value due to the higher rotation speed of the supply reel near the end of the tape. However, this arrangement has such disadvantages that it requires complex electrical circuits which are relatively expensive.

It is therefore an object of the present invention to provide a novel and improved device for detecting the rotational speed of a supply reel so as to indicate whether the rotational speed of the reel has exceeded a predetermined speed.

Another object of the present invention is to provide an improved device wherein the rotational speed of a supply reel can be detected reliably and without an increase of wow and flutter.

Still another object of the present invention is to provide an improved device for detecting the rotational speed of a supply reel, which has a simple construction and is inexpensive to manufacture.

Still another object of the present invention is to provide an improved device wherein an operator can easily and surely recognize an alarm given by the device indicating that only a little tape remains on a supply reel.

These objects are achieved according to the present invention by providing a device for detecting the rotational speed of a tape reel in a tape recording and/or reproducing apparatus comprising: tape moving means for moving a tape at a constant speed; first rotating means driven by a supply reel through a frictional mechanism to rotate in proportion to said supply reel; second rotating means driven by said tape moving means to rotate at a constant speed and mounted coaxially with said first rotating means; rotating means for rotating magnet from a first position to a second position when the rotational speed of said first rotating means exceeds said constant speed of said second rotating means; a magnetically sensitive element adapted to be actuated by said magnet at the second position; and indicating means responsive to said magnetically sensitive element so as to indicate whether the rotational speed of said supply reel is higher than a predetermined speed.

Further objects and advantages of this invention will become apparent from the following detailed description considered in connection with the accompanying drawings, in which.

Figure 1:
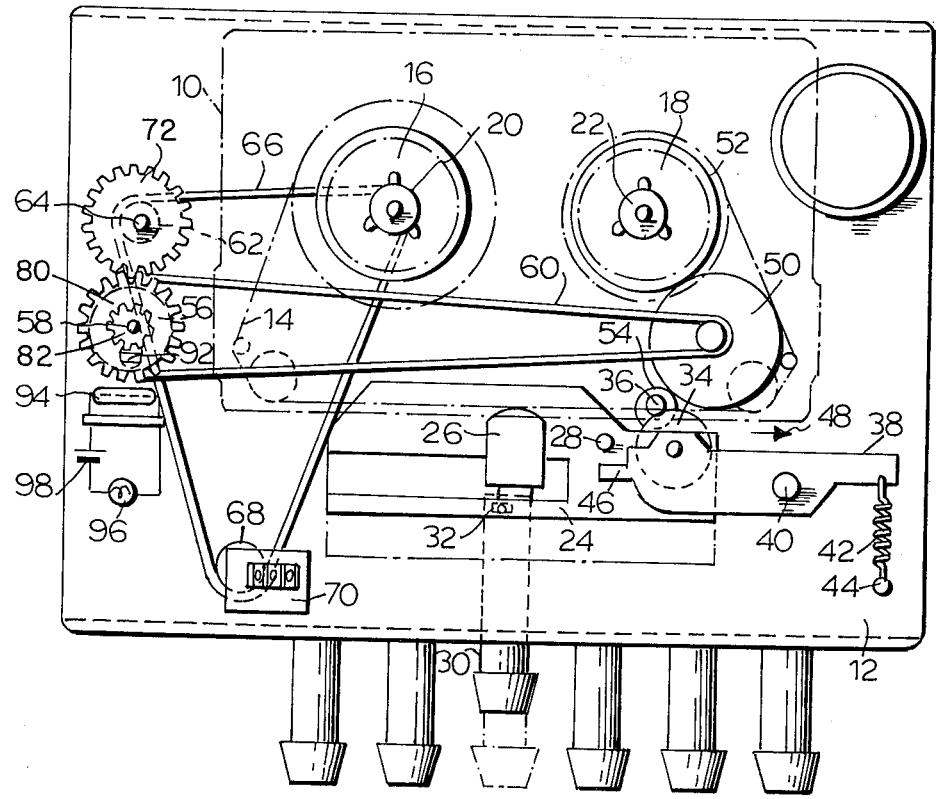
FIG. 1 is a schematic plan view of a tape recording and/or reproducing apparatus having a device for detecting the rotational speed of a tape reel according to this invention.

Referring now to the drawings, there will be described an embodiment of the device according to the present invention which is, for example, applied to a cassette tape recorder.

With reference to FIG. 1, a cassette 10 can be set on a chassis 12 as shown by dot-dash lines. The cassette 10 includes a magnetic tape 14 wound on and extending between supply and take-up reels 16 and 18 rotatable within the cassette 10. The chassis 12 has a supply reel drive shaft 20 and a take-up reel drive shaft 22 rotatably mounted thereon which are adapted to extend into the cassette 10 to engage with respective reels 16 and 18. A head carriage 24 having a magnetic head 26 and a pin 28 attached thereto is slidably mounted on the chassis 12 by a suitable guide means. A slidable operation control key 30 is connected to the head carriage 24 by a pin 32. The head carriage 24 and the operation control key 30 can be manually displaced from an inoperative position shown by dot-dash lines to an operative position shown by solid lines in FIG. 1.

A pinch roller 34 is disposed in front of a capstan 36 and is freely rotatable on a support arm 38 which is pivoted on a shaft 40 extending upwardly from the chasis 12. Thus, the pinch roller 34 is movable toward and away from the capstan 36 by the swinging motion of the support arm 38 about the shaft 40. One end of the support arm 38 is urged by a spring 42 secured on a hook 44 which is mounted on the chassis 12. The other end 46 of the support arm 38 is engagable with the pin 28 secured on the head carriage 24. The pinch roller 34 is held away from the capstan 36 by said pin 28, when the 24 is displaced to its operative position, the pinch roller 34 is pressed by the force of the spring 42 against the capstan 36, and the tape 14 will be engaged between the capstan 36 and the pinch roller 34 so as to be advanced in the direction of an arrow 48 in response to the rotation of the capstan 36. An idler wheel 50 is rotatably mounted on the chassis 12 by suitable guide means (not shown), and is adapted to be engaged with both a take-up reel roller 52 and a sleeve 54 which is fixed on the capstan 36 at the normal play-back or record condition of the tape recorder. Since the take-up reel drive shaft 22 is coaxially connected with the take-up reel roller 52, it drives the take-up reel 18 as the capstan 36 rotates.

Figure 3:
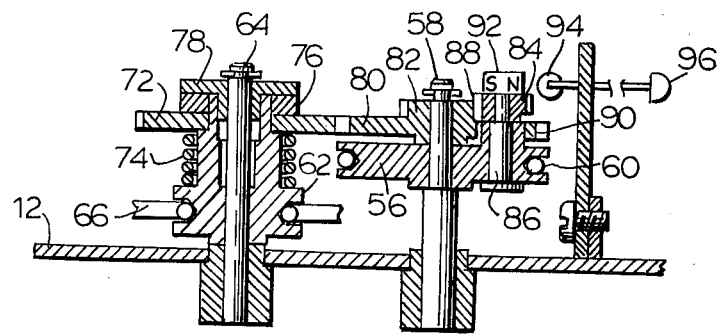
FIG. 3 is a sectional view taken along the line 3—3 of FIG. 2 (B)

Referring now to FIG. 1 and FIG. 3, a constant speed pulley 56 is rotatably mounted on a stud 58 extending upwardly from the chassis 12, and is driven by the idler wheel 50 through an endless belt 60. A follower pulley 62 is rotatably mounted on a stud 64 extending upwardly from the chassis 12, and is adapted to be driven by an endless belt 66 which is connected to the supply reel drive shaft 20 and a pulley 68 of a tape counter 70 attached to the chassis 12. A first gear 72 is rotatably mounted on the stud 64 coaxially with and independently from the follower pully 62, and is urged upwardly by a compression spring 74 so as to compress a felt disc 76 against a cap 78 fixed to a top portion of the follower pulley 62. Thus, the follower pulley 62 can drive the first geat 72 by friction force exerted between the first gear 72 and the felt disc 76 or between the felt disc 76 and the cap 78.

On the other hand, a second gear 80 is rotatably mounted on the stud 58 coaxially with and independently from the constant speed pulley 56, and is meshed with the first gear 72. A concentric first pinion gear 82 is integral with the second gear 80, and is meshed with a second pinion gear 84 fixed to a pin 86 which is rotatably mounted on a boss portion 88 of the constant speed pulley 56. The boss portion 88 is adapted to fit loosely with an arcuate slot 90. Said second pinion gear 84 has a magnet 92 fixed thereto which can control the operation of a reed switch 94 mounted on the chassis 12. When the magnet 92 assumes a posture shown in FIG. 2 (A), the magnet 92 will not actuate the reed switch 94 so that a lamp 96 is not supplied with current from a battery 98.

When the operator presses the key 30 to the position as shown by the solid lines in FIG. 1, the magnetic head 26 on the carriage 24 engages with the magnetic tape 14 in the cassette 10, and the pinch roller 34 is pressed against the capstan 36. During the rotation of the capstan 36, the tape is moved in the direction of the arrow 48, and is wrapped arround the take-up reel 18 since the take-up reel roller 52 is rotated counter-clockwise by the idler wheel 50. The rotation of the idler wheel 50 produces a constant speed rotation of the pulley 56 through the endless belt 60.

Figure 2A:
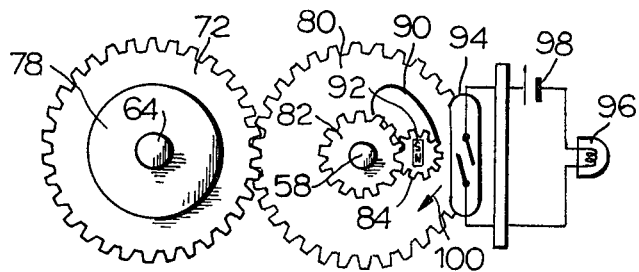
FIGS. 2A and 2B are an enlarged plan views of the device for detecting the rotational speed of the tape reel according to this invention with the parts in different positions.
Figure 2B:
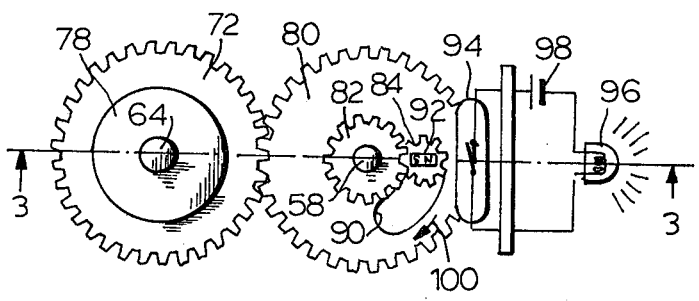
Figure 4:
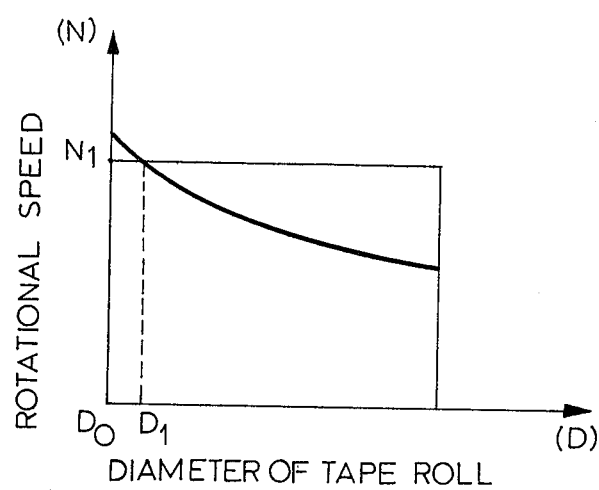
FIG. 4 is a graph which shows the relation between the rotational speed of a supply reel and the diameter of a magnetic tape on the supply reel.

On the other hand, the supply reel 16 will rotate counter-clockwise due to the movement of the tape 14. However the rotational speed of the supply reel drive shaft 20 depends on the diameter of the amount of the magnetic tape 14 on the supply reel 16. Since the follower pulley 62 is driven by the supply reel drive shaft 20 through the belt 66, the smaller the diameter D of the amount of the magnetic tape 14 on the supply reel 16 becomes, the higher the rotational speed N of the follower pulley 62 becomes as illustrated in FIG. 4. The rotational speed of the constant speed pulley 56 is predetermined to be $N_1$ which corresponds to the diameter $D_1$ of the amount of the tape 14 on the supply reel 16 which is a little larger than the diameter $D_0$ of the supply reel 16 with no tape thereon. When the diameter of the amount of the tape 14 on the supply reel 16 is larger than $D_1$, the rotational speed of the constant speed pulley 56 is faster than that of the follower pulley 62 and the first gear 72. Accordingly, the boss 88 formed on the constant speed pully 56 drives one end of the slot 90 of the second gear 80 in the direction of the arrow 100 so that the second pinion gear 84 takes the meshing position as shown in FIG. 2 (A). Under this condition, the magnet 92 fixed on the second pinion gear 84 does not operate the reed switch 94, because neither the N nor the S pole of the magnet 92 faces the reed switch 94.

When the diameter of the amount of the magnetic tape 14 on the supply reel 16 becomes smaller than $D_1$, the follower pulley 62 rotates faster than the constant speed pulley 56 so that the first gear 72 drives the second gear 80 in the direction of the arrow 100 until the other end of the slot 90 is brought into engagement with the boss 88 as shown in FIG. 2 (B). Even under this condition, the follower pulley 62 can rotate smoothly due to the slip mechanism between the follower pulley 62 and the first gear 72 as described above. As the second gear 80 moves from the position shown in FIG. 2 (A) to the position shown in FIG. 2 (B), the first pinion 82 rotates the second pinion 84 so as to bring the N or S pole of the magnet 92 to a position facing the reed switch 94. Thus, the magnet 92 actuates the reed switch 94 to close it so as to supply the current from the battery 98 to the lamp 96 which can inform the operator that only a little tape 14 remains on the supply reel 16 and the end of the tape is quite near.

It is apparent that various modification may be made without departing from the substantial properties of the invention. The above described specific examples are intended merely to illustrate the various facets in certain selective embodiments of the invention, the scope of which shall be limited only by the following claims.

What is claimed is:

1. A device for detecting the rotational speed of a tape reel in a tape recording and/or reproducing apparatus comprising:

tape moving means for moving a tape at a constant speed;

a supply reel;

first rotating means having a frictional mechansim connected to said supply reel for being driven by said supply reel to rotate at a speed in proportion to the speed of said supply reel;

second rotating means connected to said tape moving means for being driven by said tape moving means to rotate at a constant speed greater than the initial speed of said first rotating means and mounted coaxially with said first rotating means;

a first pinion gear driven by said first rotating means;

a second pinion gear mounted rotatably on said second rotating means and meshed with said first pinion gear for being rotated from a first position to a second position when the rotational speed of said first rotating means exceeds the constant speed of said second rotating means;

a magnet fixed on said second pinion gear;

a magnetically sensitive element adjacent said magnet for being actuated by said magnet at the second position of said second pinion gear; and indicating means responsive to said magnetically sensitive element for indicating that the rotational speed of said supply reel is higher than a predetermined speed when said second pinion gear is rotated to the second position.

2. A device according to claim 1, wherein said magnet is mounted on said second pinion gear for bringing one of the poles of said magnet into position facing said magnetically sensitive element when said second pinion gear moves to said second position when the rotational speed of said supply reel is higher than a predetermined speed.

3. A device according to claim 1, wherein said magnetically sensitive element is a reed switch and said indicating means is a lamp for being intermittently switched on and off to indicate that the amount of tape remaining on the supply reel has become smaller than a predetermined amount and the tape end is coming soon.

* * * * *